United States Patent Office 3,378,589
Patented Apr. 16, 1968

---

3,378,589
PROCESS OF PREPARING THE RING B CARBON ANALOG OF GRISEOFULVIN
Howard Newman, Spring Valley, and Robert Bruce Angier, Pearl River, N.Y., assignors to American Cyanamid Company, Stamford, Conn., a corporation of Maine
No Drawing. Filed May 1, 1967, Ser. No. 634,823
8 Claims. (Cl. 260—590)

ABSTRACT OF THE DISCLOSURE

The novel compound herein disclosed is 4'-chloro-2,-5',7' - trimethoxy - 6 - methylspiro[2-cyclohexene-1,2']-indan-1',4-dione, the ring B carbon analog of griseofulvin. Furthermore, a process of preparing said compound is disclosed, which comprises:

(a) Condensing equimolar quantities of 2-chloro-3,5-dimethoxybenzyl bromide with 2-carbethoxy-5-ethylenedioxy-3-methyl-cyclohexanone in the presence of sodium ethoxide in ethanol to 1-carbethoxy-1-[2-chloro-3,5-dimethoxy benzyl] - 4 - ethylenedioxy-6-methyl-2-cyclohexanone;

(b) Hydrolyzing the latter compound in an aqueous-ethanolic hydrochloric acid to 1-carbethoxy-1-[2-chloro-3,5-dimethoxybenzyl]-6-methyl-2,4-cyclohexanedione;

(c) Hydrolyzing the latter compound with sodium hydroxide to the corresponding acid compound, 1-carboxy-1-[2-chloro - 3,5 - dimethoxybenzyl]-6-methyl-2,4-cyclohexanedione;

(d) Treating said acid compound, to effect ring closure, with boron trifluoride etherate and trifluoroacetic anhydride in ether to the trione, 4'-chloro-5',7'-dimethoxy-6-methylspiro[cyclohexane-1,2'-indan]-1',2,4-trione;

(e) Methylating the trione with diazomethane to the ring B carbon analogs of griseofulvin and isogriseofulvin, and (f) Chromatographically separating the ring B carbon analog of griseofulvin from the ring B carbon analog of isogriseofulvin.

---

Generally stated, the subject matter of the present invention relates to a novel compound which is a ring B carbon analog of griseofulvin, and to a process of preparing same. More particularly, the invention relates to the compound 4' - chloro - 2,-5',7'-trimethoxy-6-methylspiro [2-cyclohexane-1,2'-indan]-1',4-dione, which has the following structural formula:

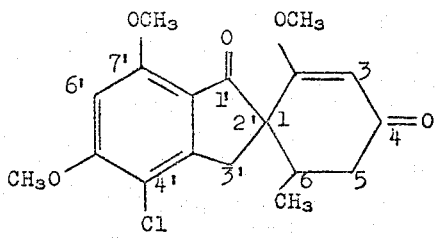

BACKGROUND OF THE INVENTION

Griseofulvin, of which the above compound is an analog is well known for its potent anti-fungal properties, and is employed as the active ingredient in several commercial preparations used in the treatment of fungal infections. The ring B carbon analog of griseofulvin prepared by the novel process of the present invention also demonstrates anti-fungal properties, for example, the compound demonstrates an anti-fungal activity when tested in vitro against *Microsporum gypseum*.

DETAILED DESCRIPTION OF THE INVENTION

The ring B carbon analog of griseofulvin, 4'-chloro-2,-5',7' - trimethoxy - 6 - methylspiro[2-cyclohexene-1,2'-indan]-1'4-dione, is prepared by condensing equimolar quantities of 2-chloro-3,5-dimethoxybenzyl bromide with 2 - carbethoxy-5-ethylenedioxy-3-methylcyclohexanone in the presence of sodium ethoxide in ethanol, followed by hydrolysis in aqueous ethanolic hydrochloric acid yielding 1 - carbethoxy - 1-[2-chloro-3,5-dimethoxybenzyl]-6-methyl-2,4-cyclohexanedione, which is then hydrolyzed with sodium hydroxide to the corresponding acid compound. The acid compound is treated with boron trifluoride etherate and trifluoracetic anhydride in ether yielding 4' - chloro-5',7'-dimethoxy-6-methylspiro[cyclohexane-1,2'-indan]-1',2,4-trione. The resulting trione is then treated with diazomethane to give the above ring B carbon analog of griseofulvin, as well as the ring B carbon analog of isogriseofulvin, namely, 4'-chloro-4,5',7'-trimethoxy - 6 - methylspiro[3-cyclohexene-1,2'-indan]-1',2-dione. The above mixture is then separated chromatographically; employing either partition or ion exchange techniques among others.

The 2-chloro-3,5-dimethoxybenzyl bromide is prepared by chlorinating 3,5-dimethoxybenzyl alcohol with N-chlorosuccinimide in carbon tetrachloride, and subsequently brominating the resulting chloro compound. The 3,5-dimethoxybenzyl alcohol may be prepared according to the process described by Adams et al., J.A.C.S. 71, 1624 (1949).

With regard to the compound 2-carbethoxy-5-ethylenedioxy-3-methylcyclohexanone, said compound is prepared by reacting 1-carbethoxy-6-methyl-2,4-cyclohexanedione with ethylene glycol in the presence of p-toluenesulfonic acid. The 1 - carbethoxy-6-methyl-2,4-cyclohexanedione may be prepared according to the process described by Shilling et al., Annalen 308, 195 (1899).

The preparation of the ring B carbon analog and the above intermediate compounds is further illustrated by the following sequence of reactions:

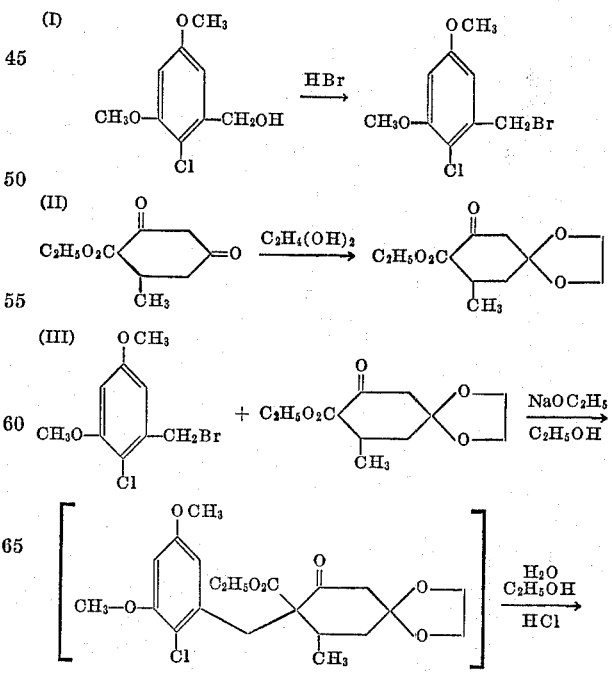

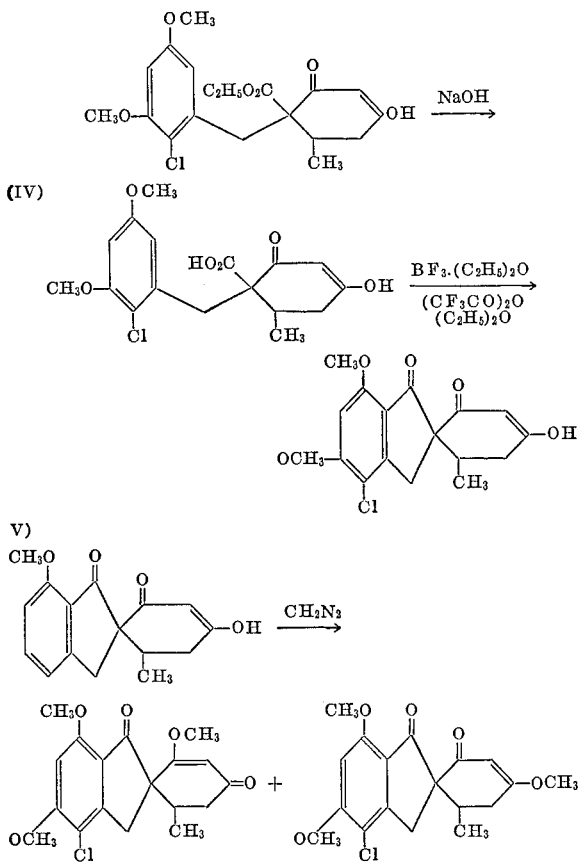

SUMMARY OF THE INVENTION

Therefore, the invention relates to the compound 4'-chloro - 2,5',7' - trimethoxy - 6 - methylspiro[2-cyclohexene-1,2'-indan]-1',4-dione, a ring B carbon analog of griseofulvin, and a process of preparing said compound, which comprises condensing equimolar quantities of 2-chloro-3,5-dimethoxybenzyl bromide with 2-carbethoxy-5-ethylenedioxy-3-methylcyclohexanone in the presence of sodium ethoxide in ethanol to 1-carbethoxy-1-[2-chloro - 3,5 - dimethoxybenzyl]-4-ethylenedioxy-6-methyl-2-cyclohexanone; hydrolyzing the latter compound in aqueous-ethanolic hydrochloric acid to give 1-carbethoxy-1-[2-chloro - 3,5 - dimethoxybenzyl]-6-methyl-2,4-cyclohexanedione. The 1-carbethoxy-1-[2-chloro - 3,5 - dimethoxybenzyl]-6-methyl - 2,4 - cyclohexanedione is hydrolyzed with sodium hydroxide to give the corresponding acid compound, 1-carboxy-1-[2-chloro - 3,5 - dimethoxybenzyl]-6-methyl-2,4-cyclohexanedione; treating said acid compound with boron trifluoride etherate and trifluoroacetic anhydride in ether, to effect ring closure, yielding the trione, 4'-chloro-5',7'-dimethoxy-6-methylspiro[cyclohexane-1,2-indan]-1',2,4-trione. The resulting trione is methylated with diazomethane to give the ring B carbon analogs of griseofulvin and isogriseofulvin respectively; namely 4'-chloro - 2,5',7' - trimethoxy - 6 - methylspiro[2-cyclohexane-1,2'-indan]-1',4-dione, and 4'-chloro-4,5',7'-trimethoxy - 6 - methylspiro[3-cyclohexene - 1,2' - indan]-1',2,4-dione. The mixture is then chromatographically separated.

The following examples are provided for illustrative purposes and may include particular features of the invention, however, the examples should not be construed as limiting the invention, many variations of which are possible without departing from the spirit or scope thereof.

Example I.—Preparation of 2-chloro-3,5-dimethoxybenzyl alcohol

A mixture of 2.0 g. (0.012 mole) of 3,5-dimethoxybenzyl alcohol and 1.6 g. (0.012 mole) of N-chlorosuccinimide in 15 ml. of carbon tetrachloride is stirred and heated under reflux for 12 hours while being irradiated with a 150 watt incandescent bulb placed close to the reaction flask. Aluminum foil which surrounds the back and sides of the flask serves as a reflector. The reaction mixture is filtered to separate the insoluble succinimide which forms and the filtrate is diluted with ether, washed with dilute aqueous sodium bisulfite, water, dried and evaporated, yielding 2.2 g. of a colorless solid which melts at about 80° C. The product is heated in boiling petroleum ether (B.P. 30–60° C.) and collected, yielding 2.0 g. of a material which has a melting point of 81–85° C. Recrystallization from hexane-ethyl acetate furnishes the analytical sample, M.P. 87–88.5° C.

Analysis.—Calc'd for $C_9H_{11}ClO_3$ (202.64): C, 53.51%; H, 5.49%; Cl, 17.55%. Found: C, 53.26%; H, 5.58%; Cl, 17.31%.

Example II.—Preparation of 2-chloro-3,5-dimethoxybenzyl bromide

Gaseous hydrogen bromide is bubbled through a cooled (ice water) solution of 1.7 g. (0.0084 mole) of 2-chloro-3,5-dimethoxybenzyl alcohol in 25 ml. of anhydrous benzene for 30 minutes. The flask is stoppered and kept at room temperature for an additional 1.5 hours. Most of the excess hydrogen bromide is removed in a stream of nitrogen, ether is added and the mixture poured into cold water. The organic phase is washed with cold aqueous bicarbonate and water, dried and evaporated to yield a solid residue which is collected after triturating with petroleum ether (B.P. 30–60° C.). An analytical sample is obtained by percolating an ethereal solution of a portion of the above product through a short column of Woelm non-alkaline, almost neutral alumina, activity I. Evaporation of the ethereal eluate leaves a colorless solid; M.P. 97.5–98.5° C. after recrystallization from cyclohexane.

Analysis.—Calc'd for $C_9H_{10}BrClO_2$ (264.54): C, 40.71%; H, 3.80%; Br, 30.10%; Cl, 13.32%. Found: C, 40.58%. H, 3.83%; Br, 30.04%; Cl, 13.70%.

Example III.—Preparation of 2-carbethoxy-5-ethylenedioxy-3-methylcyclohexanone

A solution of 32.5 g. (0.16 mole) of 1-carbethoxy-6-methyl-2,4-cyclohexanedione, obtained according to R. V. Shilling et al., Annalen 308, 195 (1899), and 9.4 ml. (0.16 mole) of commercial grade ethylene glycol, which has been stored over molecular sieves in 400 ml. of anhydrous benzene containing 0.2 g. of p-toluenesulfonic acid, is heated under reflux for 2.5 hours with continuous water separation (Dean-Stark trap). Three and two-tenths milliliters of water separates (theory—3 ml.). The benzene solution is washed with bicarbonate solution, water, dried and evaporated to yield a yellow liquid residue which is further purified by a quick, short path vacuum distillation. There distilled directly 19.9 g. (50%) of the colorless, fairly viscous liquid monoketal:

B.P. 137–140° C. (0.1 mm.); $n_D^{23.5}$ —1.4758.

$\lambda_{max}^{film}$ 5.77µ, 5.84µ (poorly resolved doubled; strong); 6.10µ and 6.23µ (weak)

Example IV.—Preparation of 1-carbethoxy-1-(2-chloro-3,5-dimethoxybenzyl)-6-methyl-2,4-cyclohexanedione To 3.7 ml. of a cooled (ice water) 0.68 N solution (determined titrimetrically) of sodium ethoxide in absolute ethanol (0.0025 mole) (prepared from metallic sodium) is added 0.6 g. (0.0025 mole) of 2-carbethoxy-5-ethylenedioxy-3-methylcyclohexanone, followed by 0.67 g. (0.0025 mole) of 2-chloro-3,5-dimethoxybenzyl bromide. The resulting suspension is permitted to warm to room temperature and stirred for 65 hours. Water is added and the organic product extracted with ether. The ethereal extracts are dried and evaporated, and the yellow liquid residue is heated under reflux for 1 hour in dilute ethanolic-aqueous hydrochloric acid to hydrolyse the ketal function. More water is added, the mixture is extracted with ether and the etheral extracts, in turn, extracted with bicarbonate solution. A gum separates upon acidification of the bicarbonate extracts which solidify after a short while. The nearly colorless solid is collected, washed with water and air dried on filter paper to give 0.01 g. of a product having a melting point of 164.5–186° C. An analytical sample, M.P. 167.5–170° C. is obtained by suspending a portion of the product in ethanol overnight at room temperature, collecting, washing with ether and drying at 80° C. in vacuo over phosphorous pentoxide for 9 hours;

$\lambda_{max.}^{Nujol}$ 5.75$\mu$; $\lambda_{max.}^{MeOH}$ 290 ($\epsilon$ 7,100), 265 ($\epsilon$ 13,500) and 230 m$\mu$ ($\epsilon$ 10,500)

Analysis.—Calc'd for $C_{19}H_{23}ClO_6$(382.83): C, 59.61%; H, 6.06%; Cl, 9.26%. Found: C, 59.49%; H, 6.23%; Cl, 9.48%.

Example V.—Preparation of 1-carboxy-1-(2-chloro-3,5-dimethoxybenzyl)-6-methyl-2,4-cyclohexanedione A suspension of 0.3 g. (0.8 mole) of 1-carbethoxy-1-(2 - chloro - 3,5 - dimethoxybenzyl) - 6 - methyl - 2,4-cyclohexanedione, obtained as described in the previous example, in 3 ml. of 30% aqueous sodium hydroxide is heated and stirred at 100° C. (oil bath temperature) for 15 hours. During the initial stages of the reaction the suspended material is an oil which is subsequently converted into a fine white solid. The reaction mixture is cooled in Dry Ice-acetone, some water is added and the mixture acidified with concentrated hydrochloric acid. The colorless gum which separates is extracted into methylene chloride and the latter extract is dried and evaporated to yield an oily residue which solidifies on trituration with ether. The yield of colorless solid is 0.18 g. of a material having a melting point of 84–85° C.

Example VI.—Preparation of 4'-chloro-5',7'-dimethoxy-6-methylspiro[cyclohexane-1,2'-indan]-1',2,4-trione A solution of 2.8 g. (0.0079 mole) of 1-carboxy-1-(2-chloro - 3,5 - dimethoxybenzyl) - 6 - methyl - 2,4-cyclohexanedione, obtained as described in the previous example, in a mixture of 15 ml. of trifluoroacetic anhydride and 20 ml. of anhydrous ether is kept at room temperature for 30 minutes, 0.6 ml. of boron trifluoride etherate is added and the reaction mixture is kept at room temperature for 35.5 hours. Most of the excess trifluoroacetic anhydride-ether is removed in vacuo and cold water is added to the residue. After 8 hours at room temperature, the mixture is made basic (pH 8 to 9) by adding the appropriate amount of sodium hydroxide pellets, and is extracted twice with methylene chloride and once with ether. A pale yellow solid separates upon acidification of the aqueous phase with concentrated hydrochloric acid which is collected after 45 minutes. After drying at 80° C. over phosphorous pentoxide in vacuo for 1 hour, the product is collected which melts at 215–228° C. dec. The compound is further purified by heating it, suspending in boiling acetone, and collecting after an additional hour at room temperature. The yield of colorless solid is 0.87 g. of a material having a melting point of 244–245° C. dec. For analysis the compound is dried at 100° C. over phosphorous pentoxide in vacuo for 17 hours; M.P. 244–245° C. dec.

$\lambda_{max.}^{Nujol}$ 3.02$\mu$, 6.00$\mu$, 6.15$\mu$, and 6.30$\mu$; $\lambda_{max.}^{MeOH}$ 315$\mu$ ($\epsilon$ 9,200), 273$\mu$ ($\epsilon$ 25,200) and 235 m$\mu$ ($\epsilon$ 28,000)

Analysis.—Calc'd for $C_{17}H_{17}O_5Cl$(336.77): C, 60.63%; H, 5.09%; Cl, 10.53%. Found: C, 60.83%; H, 5.42%; Cl, 10.50%.

Example VII.—Preparation of 4'-chloro-2,5',7'-trimethoxy-6-methylspiro[2-cyclohexene - 1,2' - indan] - 1',4-dione A suspension of 0.5 g. of 4'-chloro-5',7'-dimethoxy-6-methylspiro[cyclohexane - 1,2' - indan] - 1',2,4 - trione, compound obtained as described in the previous example, in methanol is cooled (ice water) and treated with an excess of etheral diazomethane (from N-methyl-N-nitrosourea). The reaction mixture, which is homogeneous, is stirred in the cold for an additional 45 minutes. The excess diazomethane is destroyed with acetic acid and the mixture diluted with methylene chloride. The solution is washed with aqueous bicarbonate, water, dried and evaporated to yield 0.5 g. of a colorless glass whose NMR spectrum indicates it to be a mixture of two components present in roughly equal amounts. The components are separated by partition chromatography on Celite 545 using heptane:ethyl acetate:methanol:water, 80:20:17:4. The faster moving component, the ring B carbon analog of griseofulvin, is obtained initially as a pale yellow crystalline solid (0.222 g.) which after heating, partially suspended in boiling ethanol gives 0.162 g. of 4'-chloro-4,5',7' - trimethoxy - 6 - methylspiro[3 - cyclohexane-1,2'-indan]-1',2-dione, a colorless solid; M.P. 213–216° C. (softens at about 203° C.)

$\lambda_{max.}^{Nujol}$ 5.92 and 6.11$\mu$; $\lambda_{max.}^{MeOH}$ 318 ($\epsilon$ 8,900), 266 ($\epsilon$ 20,400) and 234 m$\mu$ ($\epsilon$ 27,400)

Analysis.—Calc'd for $C_{18}H_{19}O_5Cl$(350.79): C, 61.63%; H, 5.46%; Cl, 10.11%. Found: C, 61.63%; H, 5.55%; Cl, 10.20%.

After eluting the above component the ring B carbon analog of isogriseofulvin may be washed off the column with methanol.

Although the invention has been described and illustrated by reference to particular embodiments thereof, it will be understood that in its broadest aspects the invention is not limited to such embodiments, and that variations and substitution of such equivalents may be resorted to within the scope of the appended claims.

What is claimed is:

1. The compound 4'chloro-2,-5',7'-trimethoxy-6-methylspiro[2-cyclohexene-1,2'-indan]-1',4-dione.

2. A process of preparing the compound of claim 1, which comprises:
   (a) reacting 2-chloro-3,5-dimethoxybenzyl bromide with 2 - carbethoxy-5-ethylenedioxy-3-methylcyclohexanone in the presence of sodium ethoxide in ethanol to 1-carbethoxy-1-[2-chloro-3,5-dimethoxy benzyl]-4-ethylenedioxy-6-methyl-2-cyclohexanone;
   (b) hydrolyzing the latter compound in aqueous-ethanolic hydrochloric acid to 1-carbethoxy-1-[2-chloro-3,5-dimethoxybenzyl] - 6 - methyl-2,4-cyclohexanedione;
   (c) hydrolyzing the latter compound with aqueous sodium hydroxide to the corresponding acid compound, 1-carboxy-1-[2-chloro - 3,5 - dimethoxybenzyl]-6-methyl-2,4-cyclohexanedione;
   (d) treating said acid compound, to effect ring closure, with boron trifluoride etherate and trifluoroacetic anhydride in ether to the trione, 4'-chloro-5',7'-dimethoxy-6-methylspiro[cyclohexane - 1,2' - indan]-1',2,4-trione;
   (e) methylating the trione with diazomethane to the ring B carbon analogs of griseofulvin and isogriseofulvin, and
   (f) chromatographically separating the ring B carbon analog of griseofulvin from the ring B carbon analog of isogriseofulvin.

3. A process according to claim 2, in which the ethanol of condensation step (a) is absolute ethanol.

4. A process according to claim 2, in which the mixture of reactants in condensation step (a) are allowed to warm to room temperature, and are stirred for 65 hours.

5. A process according to claim 2, in which the mixture of reactants in hydrolyzing step (c) is heated to 100° C. and stirred for 15 hours.

6. A process according to claim 2, in which the ring B carbon analog of griseofulvin is separated from the ring B carbon analog of isogriseofulvin by partition chromatography.

7. A process according to claim 6, in which a diatomaceous earth in employed as the adsorbent in the partition chromatography step.

8. A process according to claim 7, in which the ring B carbon analog of griseofulvin is eluted from the adsorbent by an eluant comprising heptane, ethyl acetate, methanol and water in a ratio of 80:20:17:4.

References Cited

Stork et al.: J. Am. Chem. Soc. 84, 310–312 (1962).

DANIEL D. HORWITZ, *Primary Examiner.*